(12) United States Patent
Guo (10) Patent No.: US 9,740,503 B2
(45) Date of Patent: Aug. 22, 2017

(54) CENTRALIZED ADMINISTRATION METHOD FOR OPERATING SYSTEM OF THIN CLIENT AND METHOD THEREOF

(71) Applicants: Inventec (Pudong) Technology Corporation, Shanghai (CN); Inventec Corporation, Taipei (TW)

(72) Inventor: Zhi Nan Guo, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 229 days.

(21) Appl. No.: 14/663,038

(22) Filed: Mar. 19, 2015

(65) Prior Publication Data

US 2016/0162303 A1 Jun. 9, 2016

(30) Foreign Application Priority Data

Dec. 4, 2014 (CN) .......................... 2014 1 0729218

(51) Int. Cl.
G06F 15/177 (2006.01)
G06F 9/44 (2006.01)
G06F 9/445 (2006.01)

(52) U.S. Cl.
CPC .............. *G06F 9/4416* (2013.01); *G06F 8/61* (2013.01); *G06F 8/63* (2013.01); *G06F 8/65* (2013.01)

(58) Field of Classification Search
USPC ................................ 709/220, 221, 222, 223
See application file for complete search history.

*Primary Examiner* — Lan-Dai T Truong
(74) *Attorney, Agent, or Firm* — David R. Stevens; Stevens Law Group (57) ABSTRACT

A centralized administration system for operating system (OS) of thin client and method thereof are disclosed, where the thin client is accessed a preboot execution environment (PXE) OS, an administration program installed in the PXE OS installs, updates or snapshot captures OS of the thin client, and a monitor message is feedback by the administration program to an administration server to be displayed immediately, so that an administration may acquire a progress, state and result of OS of the thin client installing, updating or snapshot capturing immediately and centrally. Therefore, the improving efficiency of OS of thin client management may be achieved.

10 Claims, 7 Drawing Sheets

| computer name | IP | execution state | execution progression | error information | time |
|---|---|---|---|---|---|
| ides_wildfire_ 2014A | 10.15.26.25 | running | reactivating at the thin client end | | 09/09/2014 17:21 |
| ides_wildfire_ 2014B | 10.15.26.30 | running | reactivating at the thin client end | | 09/09/2014 17:21 |

FIG. 4A

| computer name | IP | execution state | execution progression | error information | time |
|---|---|---|---|---|---|
| ides_wildfire_2014A | 10.15.26.25 | pass | finished | | 09/09/2014 17:21 |
| ides_wildfire_2014B | 10.15.26.30 | pass | finished | | 09/09/2014 17:21 |
| ides_wildfire_2014A | 10.15.26.25 | running | OS mirror image file updating, with a progression progression of 50% | | 09/09/2014 17:25 |
| ides_wildfire_2014B | 10.15.26.30 | running | OS mirror image file updating, with an execution progression of 70% | | 09/09/2014 17:24 |

FIG. 4B

| computer name | IP | execution state | execution progression | error information | time |
|---|---|---|---|---|---|
| ides_wildfire_2014A | 10.15.26.25 | pass | finished | | 09/09/2014 17:21 |
| ides_wildfire_2014B | 10.15.26.30 | pass | finished | | 09/09/2014 17:21 |
| ides_wildfire_2014A | 10.15.26.25 | fail | stopped | | 09/09/2014 17:25 |
| ides_wildfire_2014B | 10.15.26.30 | running | OS mirror image file updating, with a updating progression of 70% | | 09/09/2014 17:24 |
| ides_wildfire_2014A | 10.15.26.25 | stop | stopped | disconnected with the mirror image server end | 09/09/2014 17:27 |

FIG. 4C

| computer name | IP | execution state | execution progression | error information | time |
|---|---|---|---|---|---|
| ides_wildfire_2014A | 10.15.26.25 | pass | finished | | 09/09/2014 17:21 |
| ides_wildfire_2014B | 10.15.26.30 | pass | finished | | 09/09/2014 17:21 |
| ides_wildfire_2014A | 10.15.26.25 | fail | stopped | | 09/09/2014 17:25 |
| ides_wildfire_2014B | 10.15.26.30 | pass | OS mirror image updating finished | | 09/09/2014 17:24 |
| ides_wildfire_2014A | 10.15.26.25 | stop | stopped | disconnected with the mirror image server | 09/09/2014 17:27 |
| ides_wildfire_2014B | 10.15.26.30 | pass | Updating finished | | 09/09/2014 17:30 |

FIG. 4D

CENTRALIZED ADMINISTRATION METHOD FOR OPERATING SYSTEM OF THIN CLIENT AND METHOD THEREOF

CROSS-REFERENCE TO RELATED APPLICATION

This application claims the benefit of Chinese Patent Application No. 201410729218.0, filed Dec. 4, 2014.

BACKGROUND OF THE RELATED ART

Technical Field

The present invention relates to an administration system and method, and particularly to a centralized administration method for operating system (OS) of thin client and method thereof.

Related Art

Administration to thin clients may be convenient. However, when it is intent to install, update, or snapshot capture an operating system (OS) on multiple thin clients by the administration, the progress, state, and result regarding the install, update and snapshot capture OS tasks may not be perceived on line, provided that there is no screen for display on the thin clients.

However, even every thin client among all is connected with a screen, the administration still fails to recognize which thin client has an error occurring when the OS install, update and snap capture tasks are preceded, presenting a shortcoming on administration efficiency for the tasks.

In view of the above, it may be known that there has long been the issue where the progress, state, and result regarding the OS install, update and snapshot capture tasks at the thin clients may not be perceived on line by the administration. Therefore, there is quite a need to set forth an improvement means to settle down this problem.

SUMMARY

It is, therefore, an object of the present invention to provide a centralized administration method for operating system (OS) of thin client and method thereof to overcome the issue where a progress, state, and result regarding an OS install, update and snapshot capture tasks at the thin clients may not be perceived on line by the administration.

According to the present invention, the centralized administration system for OS of thin client comprises a plurality of thin clients, rebooting the thin clients to access a preboot execution environment (PXE) OS when the thin clients receive an execution instruction, installing, updating or snapshot capturing an OS of the thin clients used through an administration program installed in the PXE OS, monitoring a process of the installing, updating or snapshot capturing OS of the thin clients to generate and transmit a monitor message immediately by the administration program, generating an execution finish message and transmitting the execution finish message immediately when the administration program finishes the process, and rebooting the thin clients to access OS of the thin clients after the process; and an administration server, comprising a receive module, receiving at least an Internet protocol (IP) address and receiving the monitor message or the execution finish message from the administration program; a generation module, generating the execution instruction and an execution start message corresponding to the IP address; a transmission module, transmitting the execution instruction to one of the plurality of thin clients corresponding thereto; and a display module, displaying the execution start message, the monitor message, or the execution finish message.

According to the present invention, the centralized administration method for operating system (OS) of thin client comprises steps of receiving at least an IP address and generating an execution instruction and an execution start message corresponding to the IP address and displaying the execution start message by an administration server; transmitting the execution instruction by the administration server to the thin client corresponding thereto; rebooting the thin client to access a PXE OS when the thin client receive the execution instruction; installing, updating or snapshot capturing OS of the thin client through an administration program installed in the PXE OS in the thin client; monitoring a process of the installing, updating or snapshot capturing OS of the thin client by the administration program to generate and transmit a monitor message immediately to the administration server; displaying the monitor message by the administration server; generating an execution finish message and transmitting the execution finish message immediately by the administration program to the administration server when the administration program finishes the process, and rebooting the thin clients to access OS of the thin client after the process; and displaying the execution finish message by the administration sever.

The system and method of the present invention has the difference as compared to the prior art that the thin client is accessed the PXE OS, the administration program installed in the PXE OS installs, updates or snapshot captures OS of the thin client, and the monitor message is feedback by the administration program to the administration server to be displayed immediately, so that the administration may acquire the progress, state and result of OS of the thin client installing, updating or snapshot capturing immediately and centrally.

By means of the technical means, the present invention may achieve in the efficacy of an enhanced OS administration efficiency at the thin client.

BRIEF DESCRIPTION OF THE DRAWINGS

The present invention will be better understood from the following detailed descriptions of the preferred embodiments according to the present invention, taken in conjunction with the accompanying drawings, in which.

DETAILED DESCRIPTION

The present invention will be apparent from the following detailed description, which proceeds with reference to the accompanying drawings, wherein the same references relate to the same elements.

In the following, the description is first dedicated to a centralized administration system for operating system (OS) of thin client according to the present invention, with reference to FIG. 1, in which a system block diagram of a centralized administration system for OS of thin client according to the present invention is shown.

The centralized administration system for OS of thin client comprises a plurality of thin clients 10 and an administration server 20, and the administration server 20 further comprises a receive module 21, a generation module 22, a transmission module 23, and a display module 24.

At the administration server 20, the receive module 21 is used to receive at least one Internet protocol (IP) address which may be selected or inputted by an administration. The selected or inputted IP address is of the thin client 10 intent to be installed, updated or snapshot captured with an operating system (OS).

After, the receive module 21 of the administration server 20 receives at least one IP address, the generation module 22 of the administration server 20 may generate an execution instruction and an execution start message corresponding to the IP address. The execution start message comprises the IP address of the thin client, a computer name, an execution state, and a start time. However, these are merely examples without limiting the present invention.

After the generation module 22 of the administration server 20 generates the execution instruction corresponding to the IP address, the transmission module 23 of the administration server 20 transmits the execution instruction to the thin client 10 corresponding there, respectively.

Thereafter, when the thin client 10 receives the execution instruction, the thin client 10 first reboots itself to access a preboot execution environment (PXE) OS, and then the thin client 10 may use an administration program in the PXE OS to acquire an OS mirror image used for the thin client 10 from a designated mirror image server, so that it may install, update or snapshot capturing the OS for the OS used on the thin client 10.

At the same time, the administration program will monitor the OS installing, updating, and snapshot capturing process proceeding at the thin client 10 to generate a monitor message. The monitor message comprises the IP address of the thin client, the computer name, the execution state, an execution progress, and an execution time. However, these are merely examples without limiting the present invention. In such manner, the administration may monitor the OS installing, updating, and snapshot capturing process for the thin client.

When the administration program find an error occurring on the OS installing, updating, and snapshot capturing process at the thin client, it generates an error message and stops the process and transmits the error message to the administration server 20, so that the display module 24 at the administration server 20 may on line display the error message. The error message comprises the IP address of the thin client, the computer name, the execution state, an error information, and an error generation time. However, these are merely examples without limiting the present invention. In this manner, the administration may on line perceive which one among the thin clients having the error.

When the process of installing, updating and snapshot capturing the OS used on the thin client 10 is finished by the administration program, the thin client 10 is enabled to reactivate by the administration program to access the OS after the process. In this way, the process of OS installing, updating and snapshot capturing at the thin client is finished.

At the same time, the administration program may generate an execution finish message and transmit on line the execution finish message to the administration server 20, and thus the display module 24 of the administration server 20 may on line display the execution finish message. The execution finish message comprises the IP address of the thin client, the computer name, the execution state, and a finish time. However, these are merely example without limiting the present invention. In this fashion, the administration may on line perceive the process of OS installing, updating and snapshot capturing at the thin client has been finished.

Figure 1:
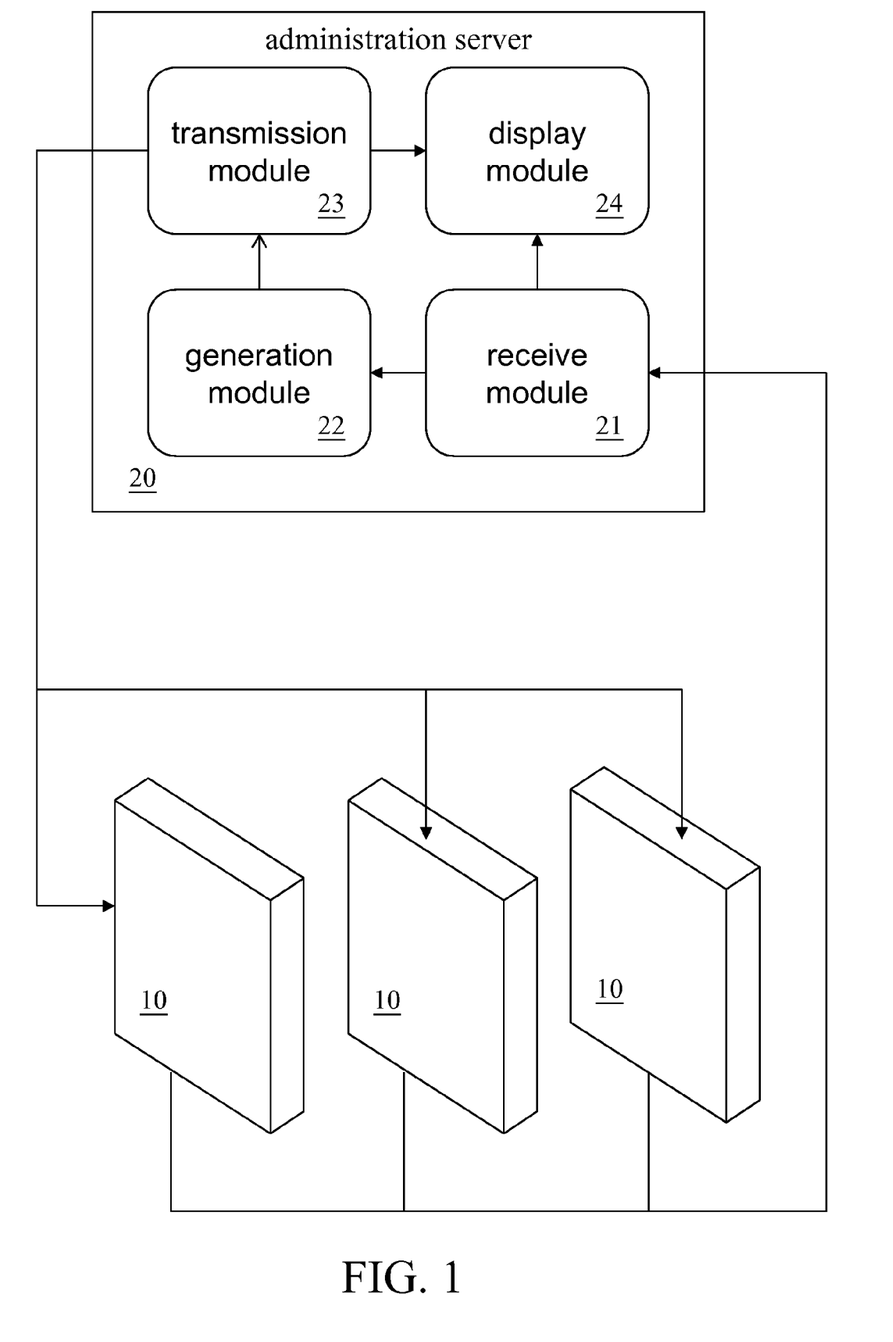
FIG. 1 is a system block diagram of a centralized administration system for operating system (OS) of thin client according to the present invention.
Figure 2:
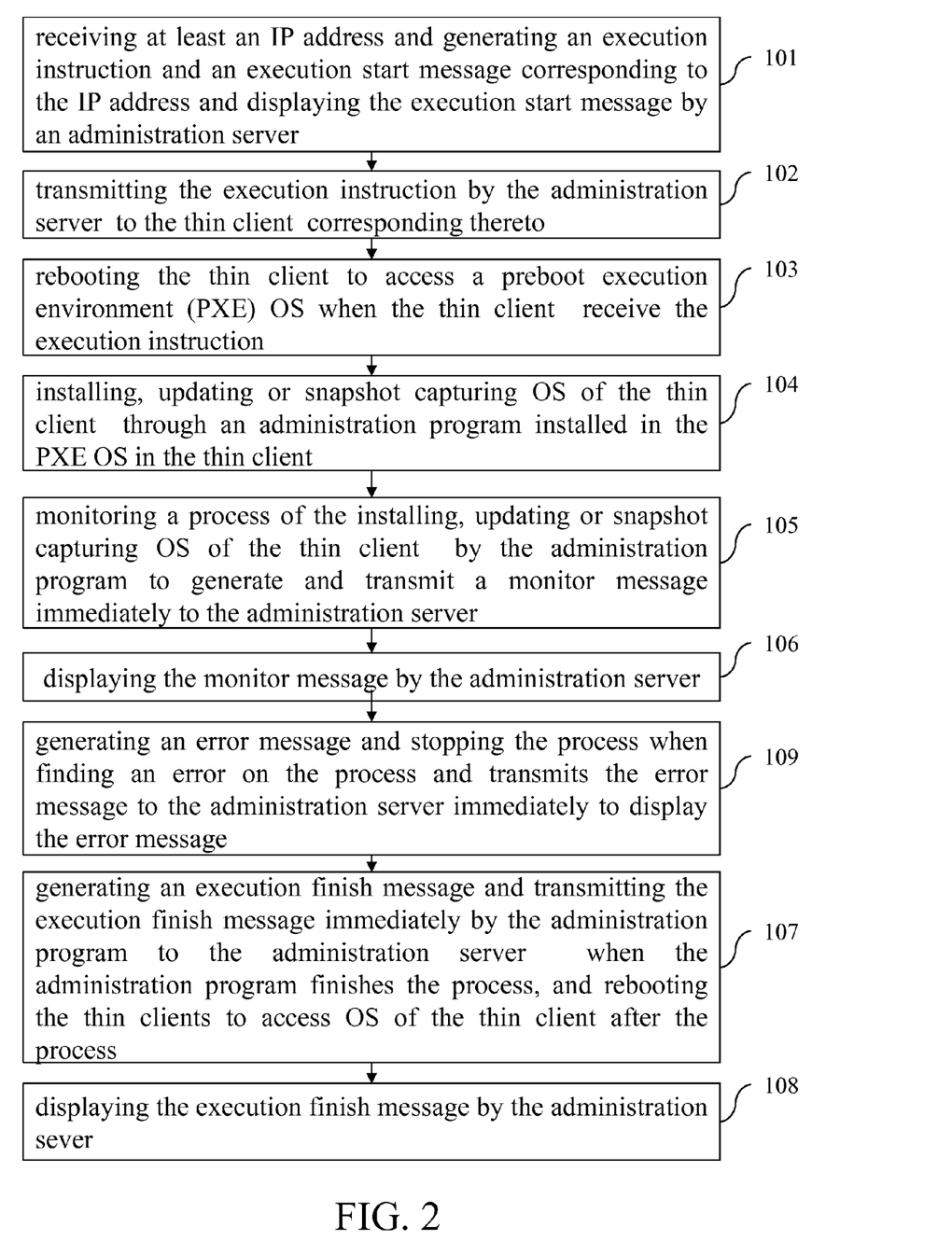
FIG. 2 is a flowchart of a centralized administration method for OS of thin client according to the present invention.
Figure 3:
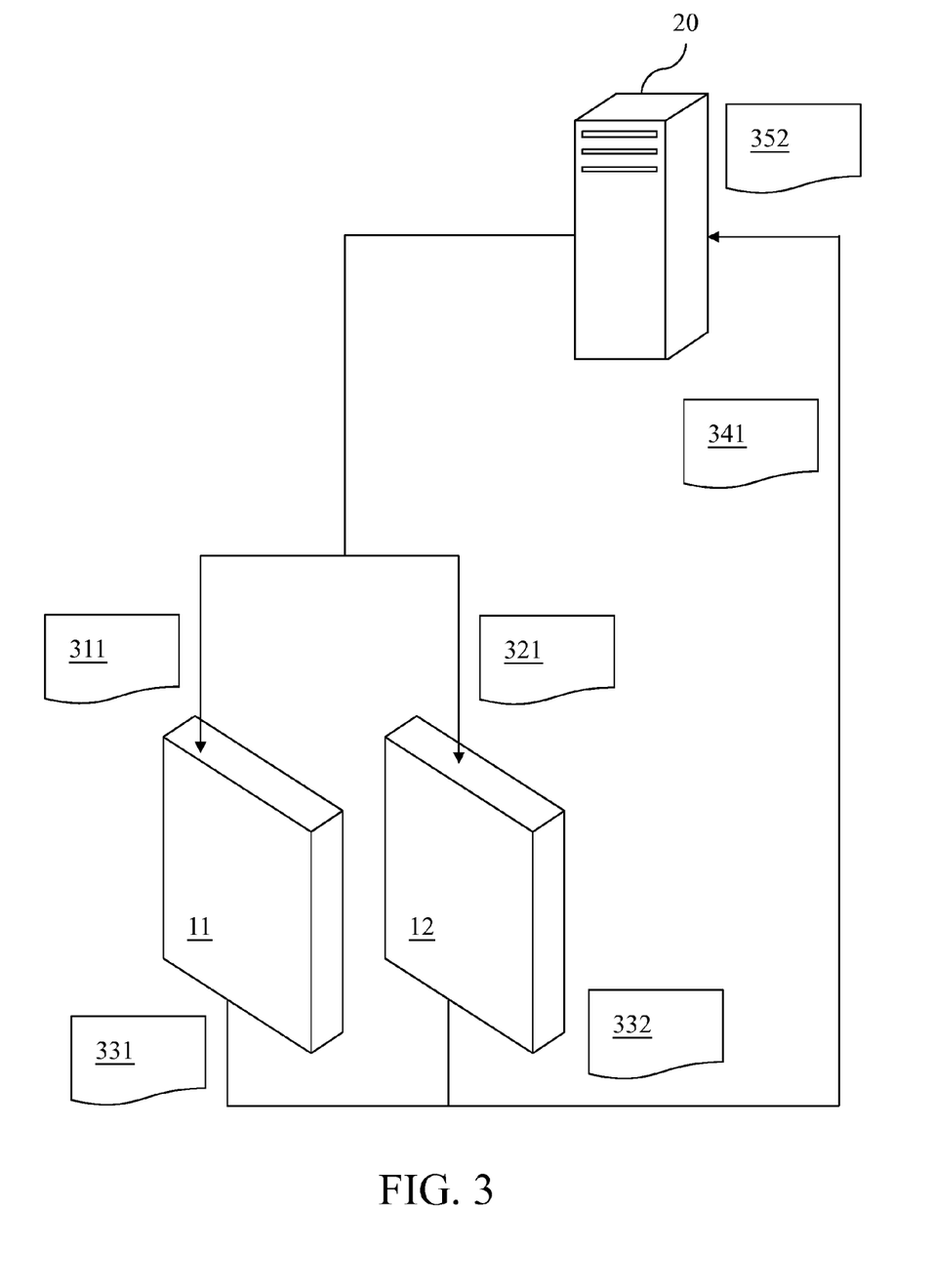
FIG. 3 is a schematic diagram of an architecture of the centralized administration system for OS of thin client according to the present invention.
Figure 4A:
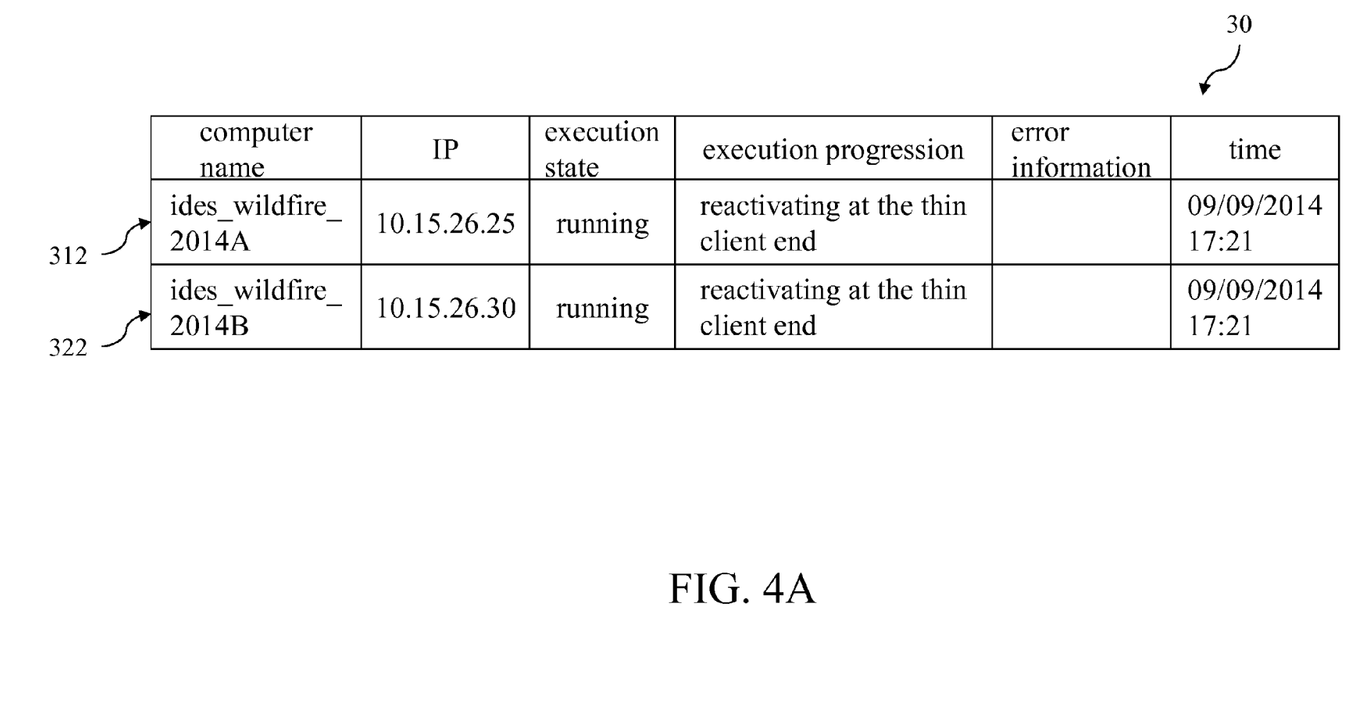
FIG. 4A is a schematic diagram of an execution start message of the centralized administration for OS of thin client according to the present invention.

Thereafter, an embodiment will be exemplified to explain the operation and process of the present invention, with simultaneous reference to FIG. 1, FIG. 2, and FIG. 3, in which FIG. 2 is a flowchart of a centralized administration method for OS of thin client according to the present invention and FIG. 3 is a schematic diagram of an architecture of the centralized administration method for OS of thin client according to the present invention, respectively Referring to FIG. 4A, an execution start message of the centralized administration method for OS of thin client according to the present invention is schematically shown therein.

The receive module 21 of the administration server 20 is used to receive two IP addresses which may be selected or inputted at an administration interface 30, "10.15.26.25" and "10.15.26.30", respectively, which belongs to the thin client 10 intent to be updated with the OS. However, these are merely examples without limiting the present invention.

Thereafter, the generation module 22 of the administration module 21 may a first execution instruction 311 and a first execution start message 312, and a second execution instruction 321 and a second execution start message 322 corresponding to the IP addresses, "10.15.26.25" and "10.15.26.30", respectively (S101), and the administration server 20 display the first and second execution start messages 312, 322 by its display module 24.

The first execution start message 312 comprises the IP address of the first thin client 11 "10.15.26.25", the computer name "ides_wildfire_2014A", the execution state "running" and the start time "09/09/2014 17:21". However, these are merely examples without limiting the present invention.

The second execution start message 322 comprises the IP address of the second thin client 11 "10.15.26.30", the computer name "ides_wildfire_2014B", the execution state "running" and the start time "09/09/2014 17:21". However, these are merely examples without limiting the present invention.

Figure 4B:
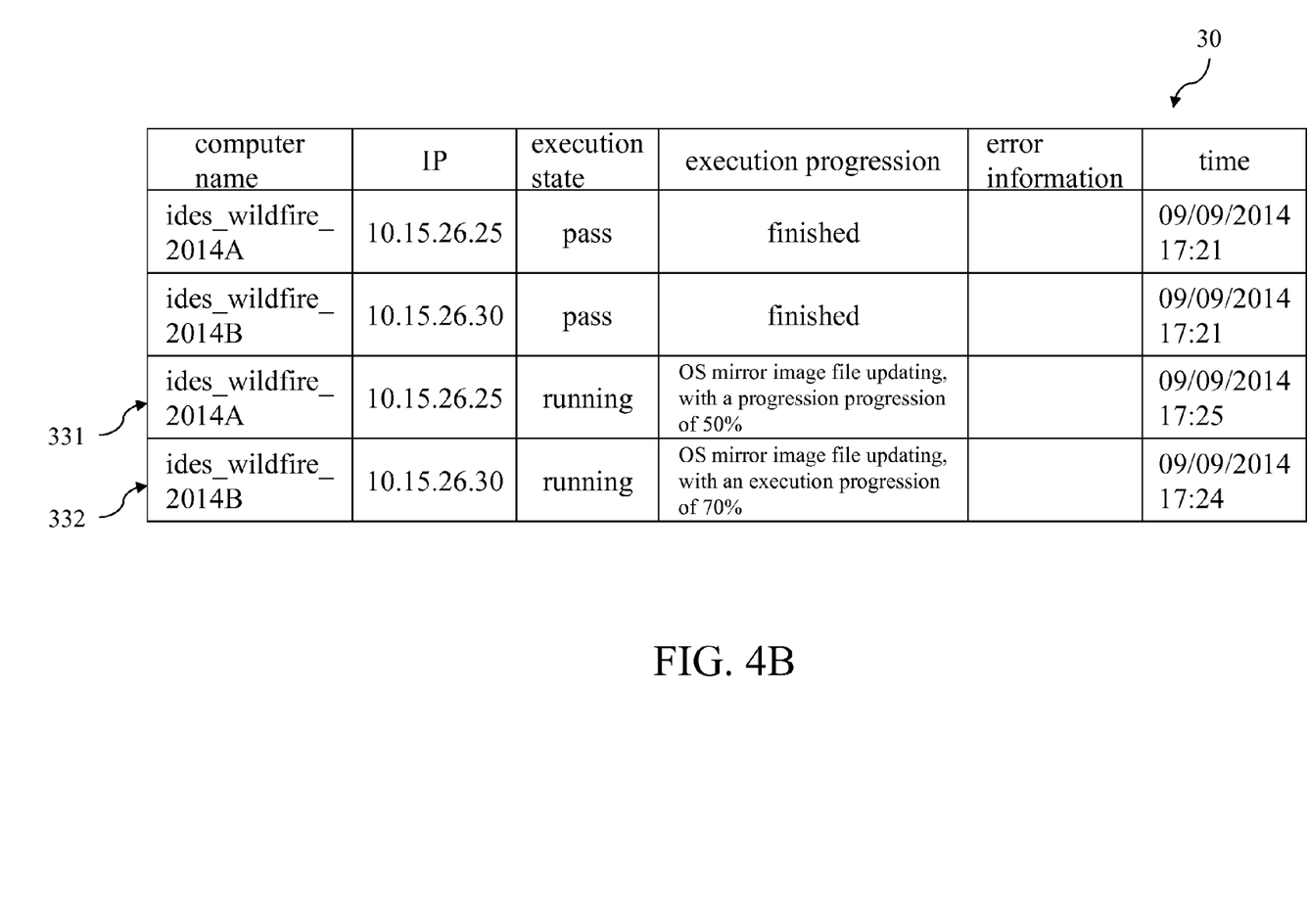
FIG. 4B is a schematic diagram of a monitor message of the centralized administration for OS of thin client according to the present invention.

Thereafter, referring to FIG. 4B, a schematic diagram of a monitor message of the execution start message according to the present invention is shown therein.

After the generation module 22 of the administration server 20 generates the IP address and the first and second execution instructions 311, 321 corresponding to the IP address, the transmission module transmits the first and second execution instructions to the first and second thin clients 211, 321 corresponding thereto, respectively (S102).

Thereafter, after the first and second thin clients 11, 12 receive the first and second execution instructions 311, 321, the first and second thin clients 11, 12 first reactivated itself to access the PXE OS used before a booting action, respectively (S103), Then, the first and second thin clients 11, 12 may acquire an OS mirror image used by the first and second thin clients 11, 12 from a designated mirror image server through an administration program installed in the PXE OS used before a booting action, respectively, so that the OS mirror image used on the first and second thin clients 11, 12 may be updated, respectively (S104).

At the same time, the administration program generates a first monitor message 331 and a second monitor message 332 by monitoring the updating process proceeded on the OS on the first and second thin clients 11, 12, respectively, and transmits on line the first and second monitor messages 331, 332 to the administration server 20 (S105), so that the display module 24 of the administration server 20 may on line display the first and second monitor messages 331, 332 (S106). In this manner, the administration may achieve in monitoring the updating process for the OS used on the thin clients 10.

The first monitor message 331 comprises the IP address "10.15.26.25", the computer name "ides_wildfire_2014A", the execution state "running", the execution progress "under being updated for the OS mirror image file, with the progress of 50%" and the execution time "09/09/2014 17:25" used on the first thin client 11. However, these are merely examples without limiting the present invention.

The second monitor message 332 comprises the IP address "10.15.26.30", the computer name "ides_wildfire_2014B", the execution state "running", the execution progress "under being updated for the OS mirror image file, with the progress of 70%" and the execution time "09/09/2014 17:24 used on the second thin client 11. However, these are merely examples without limiting the present invention.

Figure 4C:
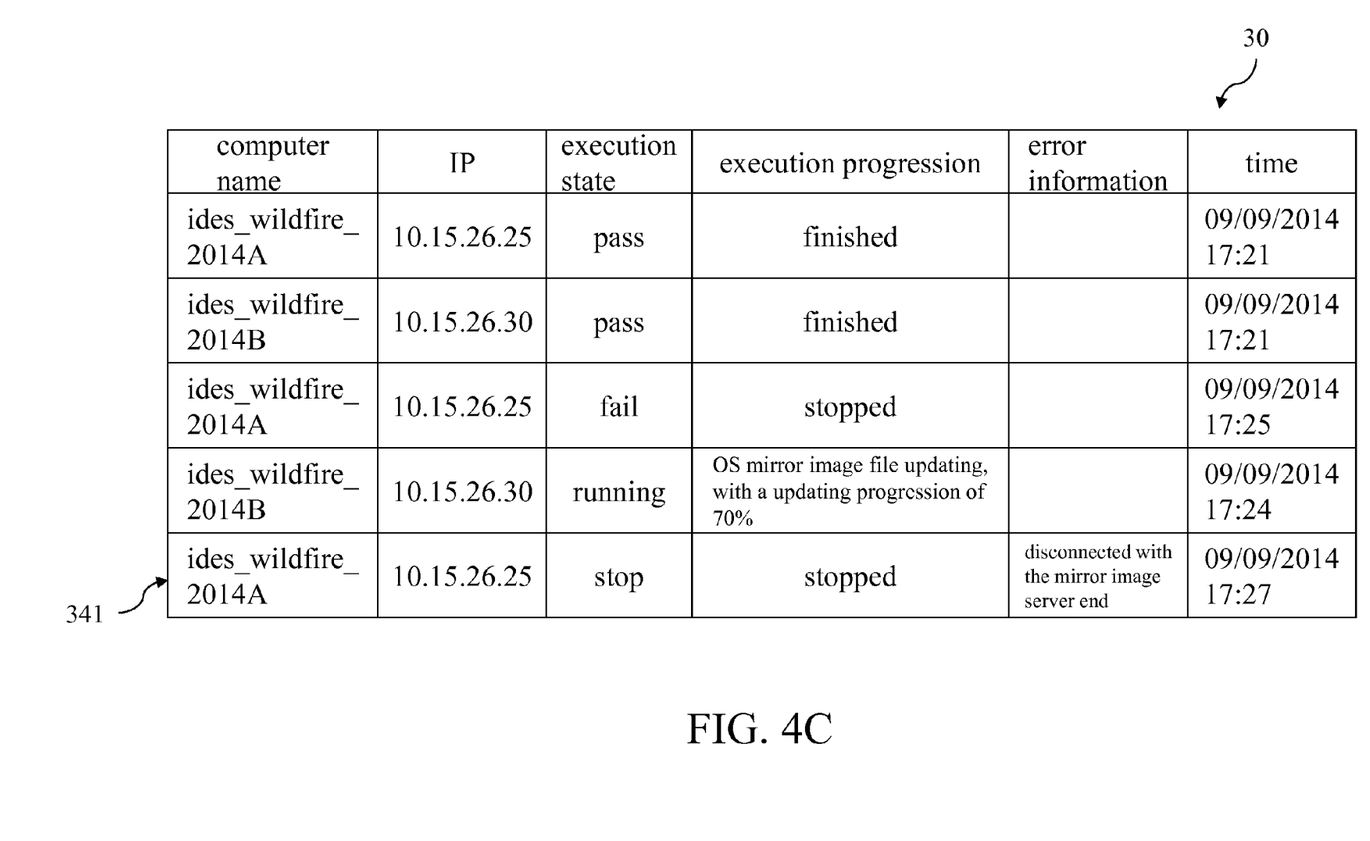
FIG. 4C is a schematic diagram of an error message of the centralized administration for OS of thin client according to the present invention.

Thereafter, referring to FIG. 4C, a schematic diagram of an error message of the execution start message according to the present invention is shown therein.

When the administration program finds an error on the updating process proceeded on the OS used on the first thin client 11, it generates a first error message 341 and stops the OS updating used on the first thin client 11, and transmits on line the first error message 341 to the administration server 20. Then, the display module 24 of the administration server 20 may on line display the first error message 341 (S109).

The first monitor message 341 comprises the IP address "10.15.26.25", the computer name "ides_wildfire_2014A", the execution state "stop", an error information "disconnected with the mirror image server" and the error generation time "09/09/2014 17:27" used on the first thin client 11. However, these are merely examples without limiting the present invention. In this manner, the administration may on line perceive that the first thin client 11 has an error occurring on its OS updating process.

The second monitor message 332 comprises the IP address "10.15.26.30", the computer name "ides_wildfire_2014B", the execution state "running", the execution progress "under being updated for the OS mirror image file, with the progress of 70%" and the execution time "09/09/2014 17:24 used on the second thin client 11. However, these are merely examples without limiting the present invention.

Figure 4D:
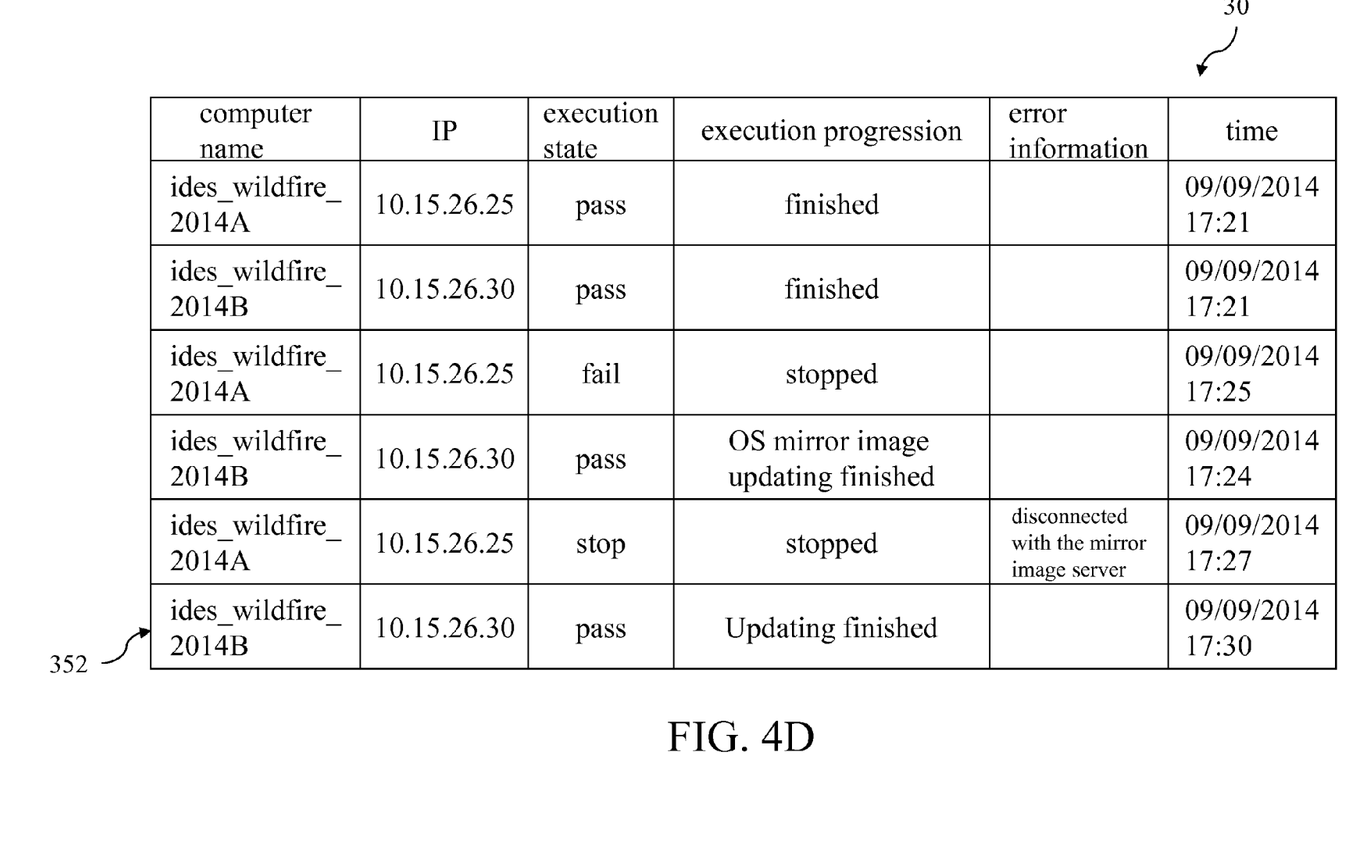
FIG. 4D is a schematic diagram of an execution finish message of the centralized administration for OS of thin client according to the present invention.

Thereafter, referring to FIG. 4D, a schematic diagram of an execution finish message of the execution start message according to the present invention is shown therein.

When the administration program finishes the updating process for the OS used on the second tin client 12, and after the second thin client 12 is enabled to reactivate to control to access the updated OS at the second thin client 12, the OS updating for the second thin client 12 is finished (S107).

At the same time, the administration program may generate a second execution finish message 352, and transmit on line the second execution finish message 352 to the administration server 20, and the display module 24 of the administration server may on line display the second execution message 352 (S108). The second execution finish message 352 comprises the IP address "10.15.26.30", the computer name "ides_wildfire_2014B", the execution state "pass", and the execution time "09/09/2014 17:30 used on the second thin client 11. However, these are merely examples without limiting the present invention. In this manner, the administration may on line perceive the OS updating process has been finished on the second thin client 12.

In summary, the system and method of the present invention has the difference as compared to the prior art that the thin client is accessed the PXE OS, the administration program installed in the PXE OS installs, updates or snapshot captures OS of the thin client, and the monitor message is feedback by the administration program to the administration server to be displayed immediately, so that the administration may acquire the progress, state and result of OS of the thin client installing, updating or snapshot capturing immediately and centrally.

By means of the technical means, the present invention may overcome the issue where the administration may not perceive the progress, state and result of the OS installing, updating and snapshot capturing on line at the thin client and thus achieve in the efficacy of an enhanced OS administration efficiency of the thin client.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A centralized administration system for operating system (OS) of thin client, comprising:
a plurality of thin clients, rebooting the thin clients to access a preboot execution environment (PXE) OS when the thin clients receive an execution instruction, installing, updating or snapshot capturing OS of the thin clients used through an administration program installed in the PXE OS, monitoring a process of the installing, updating or snapshot capturing OS of the thin clients to generate and transmit a monitor message immediately by the administration program, generating an execution finish message and transmitting the execution finish message immediately when the administration program finishes the process, and rebooting the thin clients to access OS of the thin clients after the process; and
an administration server, comprising:
a receive module, receiving at least an Internet protocol (IP) address and receiving the monitor message or the execution finish message from the administration program;
a generation module, generating the execution instruction and an execution start message corresponding to the IP address;
a transmission module, transmitting the execution instruction to one of the plurality of thin clients corresponding thereto; and a display module, displaying the execution start message, the monitor message, or the execution finish message.

2. The centralized administration system for OS of thin client as claimed in claim 1, wherein the monitor message comprises the IP address, a computer name, an execution state, an execution progress, and an execution time of the thin client.

3. The centralized administration system for OS of thin client as claimed in claim 1, wherein the execution start message comprises the IP address, a computer name, an execution state, and a start time of the thin client, and the execution finish message comprises the IP address, the computer name, the execution state, and a finish time of the thin client.

4. The centralized administration system for OS of thin client as claimed in claim 1, wherein the administration program generates an error message and stop the process when finding an error on the process and transmits the error message immediately, wherein the receive module further receives the error message from the administration program and the display module displays the error message.

5. The centralized administration system for OS of thin client as claimed in claim 4, wherein the error message comprises the IP address, a computer name, an execution state, an error information, and an error generation time of the thin client.

6. A centralized administration method for operating system (OS) of thin client, comprising:
   receiving at least an IP address and generating an execution instruction and an execution start message corresponding to the IP address and displaying the execution start message by an administration server;
   transmitting the execution instruction by the administration server to the thin client corresponding thereto;
   rebooting the thin client to access a preboot execution environment (PXE) OS when the thin client receives the execution instruction;
   installing, updating or snapshot capturing OS of the thin client through an administration program installed in the PXE OS in the thin client;
   monitoring a process of the installing, updating or snapshot capturing OS of the thin client by the administration program to generate and transmit a monitor message immediately to the administration server;
   displaying the monitor message by the administration server;
   generating an execution finish message and transmitting the execution finish message immediately by the administration program to the administration server when the administration program finishes the process, and rebooting the thin clients to access OS of the thin client after the process; and
   displaying the execution finish message by the administration sever.

7. The centralized administration method for OS of thin client as claimed in claim 6, wherein the monitor message comprises the IP address, a computer name, an execution state, an execution progress, and an execution time of the thin client.

8. The centralized administration method for OS of thin client as claimed in claim 6, wherein the execution start message comprises the IP address, a computer name, an execution state, and a start time of the thin client, and the execution finish message comprises the IP address, the computer name, the execution state, and a finish time of the thin client.

9. The centralized administration method for OS of thin client as claimed in claim 6, further comprising a step of generating an error message and stopping the process when finding an error on the process and transmits the error message to the administration server immediately to display the error message.

10. The centralized administration method for OS of thin client as claimed in claim 9, wherein the error message comprises the IP address, a computer name, an execution state, an error information, and an error generation time of the thin client.

* * * * *